INVENTOR.
André Marque

United States Patent Office 3,050,946
Patented Aug. 28, 1962

3,050,946
METHOD AND APPARATUS FOR OPERATION OF SHIP INSTALLED GAS TURBINE PLANTS
André Marque, Paris, France, assignor to Aktiengesellschaft Brown, Boveri & Cie, Baden, Switzerland, a joint-stock company
Filed Sept. 4, 1959, Ser. No. 838,109
7 Claims. (Cl. 60—102)

The present invention relates to ship propulsion systems and more particularly to such systems utilizing one gas turbine for effecting motion ahead and a separate gas turbine for effecting motion astern. The astern turbine may be installed in the same casing with the ahead turbine, or it may be placed in a separate casing. The rotor shafts of the two turbines are coupled together and transmit power to the ship screw by means of reduction gearing. Each turbine is provided with the usual inlet valve to control admission of the pressure gas.

It is known practice to control propulsion of the ship in either direction by one of two alternative modes of operation. According to one mode, the extent of the opening of the inlet valve is varied thus effecting a corresponding regulation of the pressure gas admitted to the turbine blading. According to the other mode, the inlet valve is moved to and remains in full open position and the variation in propulsion effect is produced by varying the state of the gas. Generally, the last mentioned mode of operation is preferred because it offers the advantage of avoiding additional throttle losses.

For maneuvering in harbors where low screw speed is involved, and also where an immediate change in the direction of rotation of the screw must be possible, it is known practice to feed the pressure gas to the ahead and astern turbines simultaneously and to operate the regulating devices for the respective inlet valves of the two turbines such that the torque produced by one may be made less or greater than the torque produced by the other thereby effecting either motion astern or ahead as may be required. However, an arrangement of this kind requires that there be available a gas feed system of increased output and, if necessary, an arrangement for effecting an immediate changeover from a small torque acting upon the screw to the maximum torque for motion ahead or astern.

Thus to be able to regulate the gas throughput of each inlet valve in an exact and stable manner there must be provided for these necessary maneuvering conditions complicated regulating devices with return conduction which permits adjustment of the inlet valves to any position intermediate the full closed or full open position. Moreover, since the size of the inlet valves must be comparatively large, the result is that in order to make such regulating devices, many complications are involved especially with respect to the space required and the overall costs.

The purpose of the present invention is to provide an improved arrangement and mode of operation for the ahead and astern turbines, especially useful for maneuvering in harbors or the like, which overcome the disadvantages inherent in the prior known arrangements. The improved system permits simultaneous regulation of the gas admission to both the ahead and astern turbines in a simple and low cost manner and with a minimum of space requirement.

The improved arrangement for effecting a gradual transition from motion ahead to motion astern, or vice versa, especially during harbor maneuvering, is characterized by a variation of the inlet pressure to each turbine i.e. the pressure directly in front of the turbine blading and which is produced by means of a by-pass line between the gas inlet and gas outlet of at least one of the turbines, the by-pass line having a regulatable valve therein for controlling the amount of gas by-passed through the line. The valve-controlled by-pass may be associated with the ahead turbine, or with the astern turbine, or with both turbines.

Various embodiments of the invention will be described hereinafter in detail and are illustrated respectively in the accompanying drawings. In these drawings.

Figure 3:
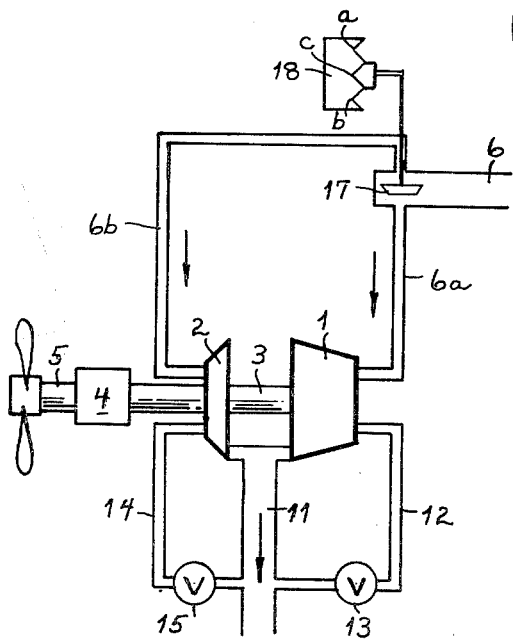
FIG. 3 is also a diagrammatic presentation of a somewhat different embodiment for the inlet valve arrangement for the ahead and astern turbines where a single pressure gas feed line is employed, the inlet valves for the two turbines being integrated into a single structure.
Figure 4:
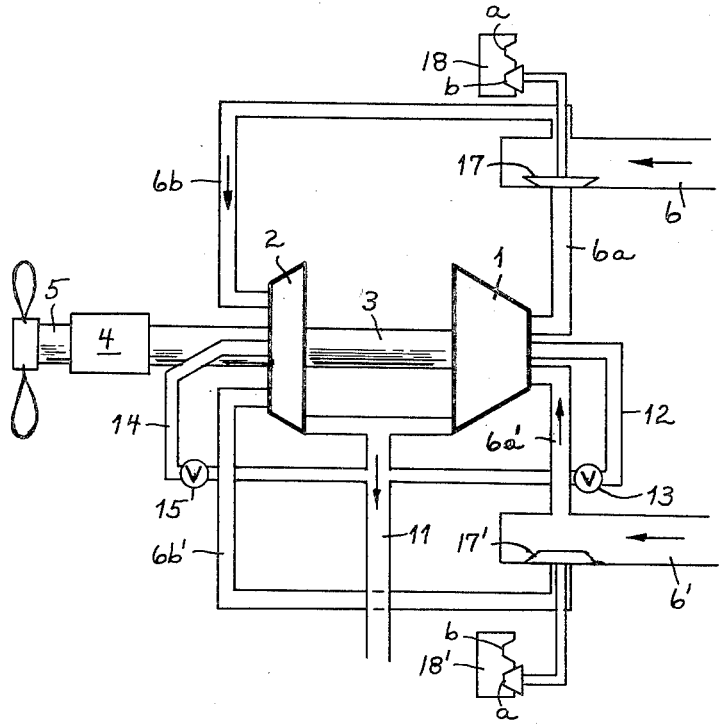
Figure 5:
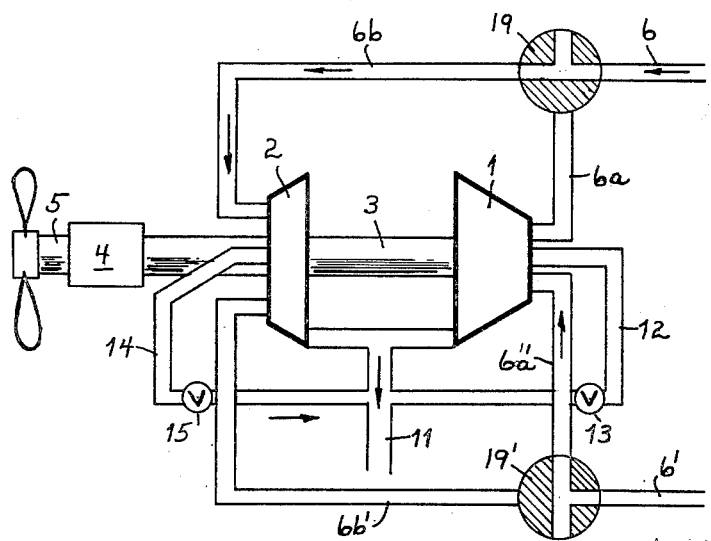

FIG. 4 is a diagrammatic presentation of a somewhat different embodiment wherein dual pressure gas feed lines are provided for the ahead and astern turbines and a single integrated inlet valve structure as in FIG. 3 is provided in each line; and FIG. 5 is a diagrammatic presentation of another embodiment having dual pressure gas feed lines and utilizing simple, three-way inlet valves for controlling gas admission to the turbines.

Figure 1:
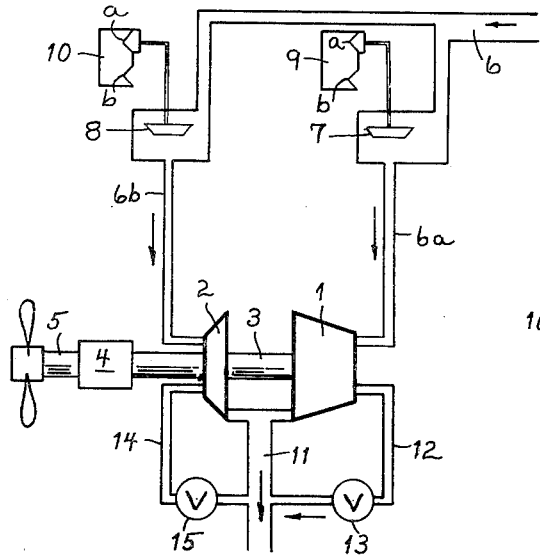
FIG. 1 is a diagrammatic presentation of one embodiment utilizing a single pressure gas feed line for the ahead and astern turbines and wherein each turbine is provided with its own, and separate, inlet valve, these valves being constructed so as to occupy either their fully closed or fully open positions.

With reference now to the embodiment illustrated in FIG. 1, the propulsion system for the ship includes a turbine 1 for effecting motion of the ship ahead and a second, and usually smaller, turbine 2 for effecting motion astern. In this particular embodiment the rotor elements of the two turbines are connected in common to a drive shaft 3 and the latter is connected via the usual reduction gear transmission 4 to the screw shaft 5. Obviously, turbine 1 drives shaft 3 in one direction of rotation and turbine 2 drives shaft 3 in the opposite direction.

Pressure gas for operating the turbines is supplied through a common feed line 6 which then divides into one branch line 6a feeding the ahead turbine 1 and another branch line 6b feeding the astern turbine 2. Flow of gas into branch line 6a is controlled by an inlet valve 7 and flow of gas into branch line 6b is controlled by an inlet valve 8. Valves 7 and 8 are of like construction and are arranged to occupy only their full open or full closed positions as determined respectively by the position of the valve stem at *a* or *b* on the detent mechanisms 9 and 10 respectively. Thus, the inlet valves 7 and 8 can be said to be "non-regulatable" in the sense that they are not designed to be regulated as to their degree of opening for the purpose of regulating the amount of pressure gas delivered to the ahead or astern turbines.

The outlets for the turbines 1 and 2 are manifolded and lead to a common outlet duct 11.

In accordance with the invention, either or both the ahead and astern turbines are provided with a by-pass line between the inlet and outlet thereof and each such by-pass is provided with a valve by which to regulate the amount of the gas which is by-passed thus effecting a corresponding regulation of the pressure of the gas at the inlet to the turbine in question. In the embodiment which has been illustrated, both turbines are seen to be provided with these by-pass lines but it is understood that one or the other may be eliminated. The by-pass line for ahead turbine 1 is indicated at 12 and includes the regulating valve 13. The by-pass line for the astern turbine 2 is indicated at 14 and includes the regulating valve 15.

The turbine system illustrated in FIG. 1 is operated in accordance with the following modes.

A. *Operation Ahead*

Valve 7 is moved to its full open position and valve 8 is moved to its full closed position. With this arrangement of the inlet valves, no gas will be admitted to the astern turbine 2 and the amount of forward propulsion can be regulated by variation in the state of the gas at the inlet to the ahead turbine 1. By-pass valves 13 and 15 are closed.

B. *Operation Astern*

Valve 8 is moved to its full open position and valve 7 is moved to its full closed position. With this arrangement of the inlet valves, no gas will be admitted to the ahead turbine 1 and the amount of rearward propulsion can be regulated by variation in the state of the gas at the inlet to the astern turbine 2. By-pass valves 13 and 15 are closed.

C. *Harbor Maneuvering*

Both valves 7 and 8 are moved to their full open positions. With this arrangement of the inlet valves, gas is admitted to both the ahead and astern turbines, and the transition from motion ahead to motion astern, or vice versa, can be achieved by varying the control valve 13 in the by-pass line 12 and/or by varying the control valve 15 in the by-pass line 14. This serves to effect a corresponding variation in the gas pressure directly in front of the blading of the respective turbines notwithstanding the fact that the inlet valves 7 and 8 of these turbines are in their full open positions. The same result is obtained if one or the other of the two by-pass lines is eliminated. However, by combining the two, the scope of operation and maneuvering ability is increased. As the control valve 13 or 15, or both are adjusted, three different torque situations can be established. First, the torque produced by the astern turbine can be made equal to the torque produced by the ahead turbine in which case the shaft 3 will not rotate since these torques are applied in opposite directions to the shaft. Second, the torque produced by the astern turbine can be made to predominate over that produced by the ahead turbine in which event the ship will move backwards. Third, the torque produced by the ahead turbine can be made to predominate over that produced by the astern turbine in which event the ship will move forward. For operation with full torque on the ship's screw, whether astern or ahead, it suffices to completely close either valve 7 or 8 as the case may be.

The advantages of the improved arrangement can be summed as follows:

Because inlet valves 7 and 8 remain in a fixed position i.e. either fully closed or fully open during maneuvering in harbors and the like, as well as during times when the ship is in continuous operation either in a forward or backward direction for a substantial time, such valves may be made according to a very simple and sturdy construction. Moreover, complicated regulating devices taking up much space are then unnecessary. The regulating valve 13, 15 in the by-pass line can be made very small in relation to the size of the inlet valves 7 and 8 and hence its design and operation offer no difficulties. Thus perfect safety of operation and mobility are achieved.

Figure 2:
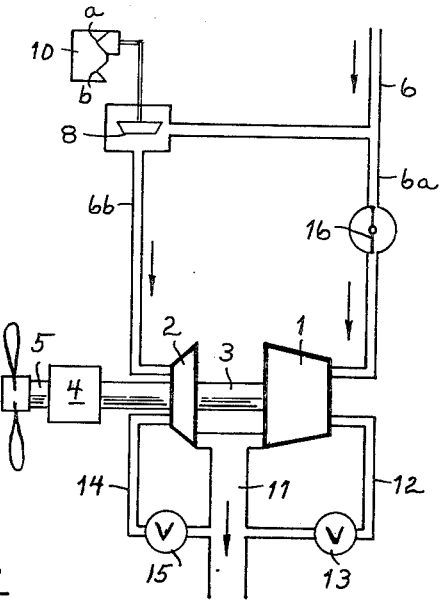
FIG. 2 is a diagrammatic presentation of a second embodiment very similar to that shown in FIG. 1 but wherein the inlet valve for the ahead turbine is of a somewhat different construction.

In the modified embodiment illustrated in FIG. 2, a different form of inlet valve structure for the ahead turbine 1 is provided. This embodiment is applicable to ships where it is not absolutely necessary to move astern with full power, e.g. in merchant ships and is characterized by the fact that the inlet valve of the ahead turbine 1 when in closed position need not effect an absolute cut off of the pressure gas. Consequently, the inlet valve can be made more simple and is illustrated as a simple flap valve 16. The remaining structure is identical with that shown in FIG. 1 and hence corresponding elements have been designated with the same reference numerals. Operation of the FIG. 2 arrangement is likewise the same as has been described with respect to the FIG. 1 embodiment.

In the modified embodiment illustrated in FIG. 3, construction is somewhat simplified over that of FIG. 1 in that the inlet valves for the ahead and astern turbines are integrated into a common structure. This common valve 17 has three positions as determined by the position of the valve stem at either *a*, *b* or *c* of the detent mechanism 18. When in the upper position *a*, the branch line 6*b* leading to the astern turbine 2 is closed and the branch line 6*a* leading to the ahead turbine 1 is open. Thus pressure gas can flow only to the ahead turbine 1. When in the lower position *b*, branch line 6*b* is open and branch line 6*a* is closed. Thus, pressure gas can flow only to the astern turbine 2. When in the middle position *c*, which is the position taken for maneuvering, both branch lines 6*a* and 6*b* are open and thus gas can flow to both turbines in the ratio as determined by the setting of the control valves 13 and/or 15 in the by-pass lines. Operation is thus in accordance with the same principles as the embodiment of FIGS. 1 and 2.

The embodiment illustrated in FIG. 4 is similar to that of FIG. 3 except that dual gas feed lines 6 and 6' are provided for the turbines thus duplicating the inlet valves and branch lines to the turbines. These duplicated components have accordingly been designated by the same reference numerals but with primes added thereto for purposes of distinction.

For motion ahead, valves 17 and 17' are moved to the position closing off branch lines 6*b* and 6*b*' leading to the astern turbine 2 and simultaneously opening branch lines 6*a* and 6*a*'. Thus gas flow through branch lines 6*a* and 6*a*' to the ahead turbine 1 and regulation of the propulsion effect is effected by variation in the state of the pressure gas.

For motion astern, valves 17 and 17' are moved to the position of closing off branch lines 6*a* and 6*a*' leading to the ahead turbine 1 and simultaneously opening branch lines 6*b* and 6*b*'. Thus gas flows through the latter to the astern turbine 2 and regulation of the propulsion effect is likewise effected by variation in the state of the pressure gas.

For close maneuvering in harbors involving short backward and forward movements of the ship, valve 17 is moved to the position closing off branch line 6*a* whereupon the gas supply for the astern turbine 2 is from supply line 6 and branch line 6*b*. Valve 17' is moved to the position closing off branch line 6*b*' whereupon gas supply for the ahead turbine 1 is from supply line 6' and branch line 6*a*'. Alternatively, valve 17 can be shifted close off branch line 6*b* and valve 17' shifted to close off branch line 6*a*'. The desired forward or backward movement of the ship required for maneuvering can now be obtained by regulating the valves 13 or 15, or both, in their respective by-pass lines 12 or 14 depending upon whether one or two such by-pass lines are utilized. If desired, the dual gas supply line arrangement according to FIG. 4 can utilize the dual inlet valve arrangement as in FIG. 1 or in FIG. 2.

The embodiment of FIG. 5 is very similiar to that shown in FIG. 4 except that the inlet valve structure is modified to a comparatively simple three-way element, these being designated 19 and 19'.

The advantage of the embodiment according to FIG. 4 or FIG. 5 is that it results in even greater mobility in maneuvering the ship.

In conclusion, it is desired to point out that while various embodiments of the invention have been described and illustrated, the types and number of inlet valves and feed lines for the pressure gas, as well as the physical arrangement of the turbines can be departed from without, however, departing from the spirit and scope of the invention as defined in the appended claims. For example, the ahead and astern turbines may be built completely separate from one another, each having its own casing, rotor, drive shaft, etc. and suitably coupled to the screw shaft through the reduction gearing. Also, the pressure gas for driving the turbines may be derived from any suitable source such as a combustion chamber, the exhaust from an internal combustion piston engine, or a free piston gas producer, etc.

I claim:

1. In a ship installed gas turbine plant for effecting propulsion, the combination comprising an astern turbine, an ahead turbine, means coupling said turbines to the ship screw, a non-regulatable inlet valve for each turbine, said valves being arranged to occupy only a fully open or a fully closed position for controlling admission of pressure gas to said turbines from a main pressure gas feed line, a by-pass line from the inlet to the outlet of at least one of said turbines and a regulatable valve in said by-pass line for controlling the amount of pressure gas by-passed with said inlet valves in full open position thereby to effect a corresponding variation in the relative torques produced by said turbines so that during maneuvering of said ship, said torques can be made equal or one to predominate the other.

2. A ship installed gas turbine plant as defined in claim 1 wherein said by-pass line is provided between the inlet and outlet of said ahead turbine.

3. A ship installed gas turbine plant as defined in claim 1 wherein said by-pass line is provided between the inlet and outlet of said astern turbine.

4. A ship installed gas turbine plant as defined in claim 1 wherein by-pass lines are provided between the inlet and outlet of said ahead and said astern turbines.

5. A ship installed gas turbine plant as defined in claim 1 wherein a single main pressure gas feed line is provided, said main line being branched into two lines feeding the respective astern and ahead turbines, and wherein said inlet valves are disposed in said branch lines.

6. A ship installed gas turbine plant as defined in claim 1 wherein a single main pressure gas feed line is provided, said main line being branched into two lines feeding the respective astern and ahead turbines, and wherein said inlet valves are integrated into a common valve structure.

7. A ship installed gas turbine plant as defined in claim 1 wherein dual main pressure gas feed lines and inlet valves are provided for each of said turbines, the inlet valve controlling gas flow from one of said main pressure gas lines to said ahead turbine during maneuvering of the ship being fully open when the inlet valve controlling gas flow from the other pressure gas line to said ahead turbine is fully closed, and the inlet valve controlling gas flow from one of said main pressure gas lines to said astern turbine during maneuvering of the ship being fully open when the inlet valve controlling gas flow from the other pressure gas line to said astern turbine is fully closed, said inlet valves being actuated so that one of said main pressure gas line supplies said ahead turbine and the other main pressure gas line supplies said astern turbine.

References Cited in the file of this patent

UNITED STATES PATENTS

| | | |
|---|---|---|
| 962,511 | Kincaid | June 28, 1910 |
| 1,063,603 | Samuelson | June 3, 1913 |
| 1,615,697 | Halliwell | Jan. 25, 1927 |
| 2,247,845 | Meyer | July 1, 1941 |
| 2,477,184 | Imbert et al. | July 26, 1949 |
| 2,535,488 | Dros | Dec. 26, 1950 |
| 2,718,751 | Huber | Sept. 27, 1955 |
| 2,816,731 | Dantowitz | Dec. 17, 1957 |
| 2,914,242 | Meienberg | Nov. 24, 1959 |

FOREIGN PATENTS

| | | |
|---|---|---|
| 1,023,638 | Germany | Jan. 30, 1958 |